(12) United States Patent
Seeman et al.

(10) Patent No.: US 11,034,257 B2
(45) Date of Patent: Jun. 15, 2021

(54) METHOD AND SYSTEM FOR ESTIMATING REMAINING BATTERY PACK ENERGY USING CELL-GROUP STATE OF CHARGE SPREAD

(71) Applicant: GM Global Technology Operations LLC, Detroit, MI (US)

(72) Inventors: Garrett M. Seeman, Novi, MI (US); Justin Bunnell, Northville, MI (US); Ciro A. Spigno, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 231 days.

(21) Appl. No.: 16/245,507

(22) Filed: Jan. 11, 2019

(65) Prior Publication Data
US 2020/0223322 A1 Jul. 16, 2020

(51) Int. Cl.
*B60L 58/12* (2019.01)
*B60L 50/60* (2019.01)
*B60L 50/51* (2019.01)

(52) U.S. Cl.
CPC ............... *B60L 58/12* (2019.02); *B60L 50/51* (2019.02); *B60L 50/60* (2019.02); *B60L 2210/40* (2013.01)

(58) Field of Classification Search
CPC .......... B60L 58/12; B60L 50/60; B60L 50/51; B60L 2210/40; B60L 2250/16; B60L 3/0046; B60L 58/21; B60L 2240/545; B60L 2240/547; B60L 2240/549; Y02T 10/70
See application file for complete search history.

(56) References Cited

U.S. PATENT DOCUMENTS

| | | | |
|---|---|---|---|
| 9,037,426 B2 * | 5/2015 | Schaefer | B60L 58/22 |
| | | | 702/63 |
| 9,575,128 B2 | 2/2017 | Frost et al. | |
| 2014/0203813 A1 * | 7/2014 | Driemeyer-Franco | |
| | | | B60L 58/21 |
| | | | 324/434 |

FOREIGN PATENT DOCUMENTS

JP 2004080909 A * 3/2004

OTHER PUBLICATIONS

English Translation of JP-2004080909-A.*

* cited by examiner

Primary Examiner — Rami Khatib
Assistant Examiner — Shahira Baajour
(74) Attorney, Agent, or Firm — Quinn IP Law

(57) ABSTRACT

A method for estimating remaining energy in a battery pack having series-connected cells/cell groups includes measuring battery parameters, including a battery voltage, current, and temperature. The controller estimates a static state of charge difference ($\Delta SOC$) value and a current-dependent $\Delta SOC$ value in real-time using the parameters, including calculating the static $\Delta SOC$ value as a difference between an average SOC of the battery pack and an SOC of a weakest/lowest energy cell group. The current-dependent $\Delta SOC$ value is a percentage SOC per unit of the current. The static $\Delta SOC$ value and current-dependent $\Delta SOC$ values are filtered via a multi-parameter state estimator block. Using the filtered state values, the controller executes a control action responsive to the estimated remaining energy, including displaying the remaining energy and/or a quantity derived from the remaining energy via a display device. A powertrain system includes the controller, electric machine, and battery pack.

20 Claims, 6 Drawing Sheets

METHOD AND SYSTEM FOR ESTIMATING REMAINING BATTERY PACK ENERGY USING CELL-GROUP STATE OF CHARGE SPREAD

INTRODUCTION

High-energy electrochemical battery packs configured for use as power supplies in vehicles, mobile systems, power plants, and other electrical systems may be constructed from sections of interconnected cell stacks. Each cell stack includes several battery cells having an internal cell stack-up, which in turn includes a thin layer of insulating material positioned between oppositely-charged electrode foils. The cell stack-up is sealed within an outer pouch containing an electrolyte material, with extensions of the electrode foils protruding from the pouch edges to form positive and negative cell tabs. The cell tabs are ultimately welded together via interconnecting members or weld caps to construct the battery pack.

Real-time monitoring of dynamically-changing thermo-electric properties of the battery pack and its constituent battery cells helps ensure optimal pack performance. Monitored battery parameters include a state of charge (SOC) of the battery pack, with SOC often expressed as a percentage of a new/fully-charged baseline SOC level. Cell-balancing strategies are used to switch individual battery cells into and out of an electrical circuit as needed in order to roughly balance the SOC of the individual battery cells.

Differences in individual cell voltages/SOCs of the various battery cells are accounted for in electric range estimation methodologies using temperature-based lookup tables. SOC lookup tables may be populated with expected performance data for an ideal/well-balanced battery pack. However, latent construction defects, failures or errors in the above-noted cell-balancing strategies or associated hardware, and/or variations in the self-balancing rates of the battery cells can result in voltage differences exceeding programmed levels of the above-noted SOC lookup tables. As a result, a battery controller may overestimate the amount of remaining energy in the battery pack.

SUMMARY

The present disclosure pertains to energy and range estimation techniques for use with powertrain systems having an electric machine or other load connected to a multi-cell battery pack. The battery pack includes multiple series-connected cells or cell groups. Each respective cell/cell group is constructed from parallel-connected battery cells of the type generally described above. An algorithm as disclosed herein is executable in real-time by a battery controller to enable the controller to estimate a usable amount of remaining energy in the battery pack, and to execute appropriate control actions responsive to the amount of remaining energy.

As described in detail below with reference to the various drawings, the controller achieves improved range estimation accuracy by estimating at least two state parameters: a static state of charge difference ($\Delta$SOC) value, i.e., a difference/delta ($\Delta$) between an average SOC of the battery pack as a whole and an SOC of the weakest/lowest energy cell group of the battery pack, and a dynamically-changing current-dependent $\Delta$SOC value. As used herein, the term "static" means that the value is not dependent on another input, as opposed to "never changing". Other state parameters may be used, e.g., temperature. The controller may filter the static $\Delta$SOC value and current-dependent $\Delta$SOC value, with the latter value possibly calculated as a percentage SOC-per-unit of battery current. The controller thereafter uses the filtered state values to estimate the usable amount of remaining energy in the battery pack.

The controller may also be programmed to execute appropriate control actions based on the estimated remaining energy. For example, when the battery pack is used as part of a powertrain system in a mobile application, e.g., of a vehicle, robot, or a mobile platform, the controller may quickly predict and display a remaining electric range and/or select and execute a powertrain mode to allocate more or less energy from the battery pack to a driven load as needed. Stationary systems employing the battery pack and using the present methodology may also benefit from use of the present method, such as by controlling a speed or a shutdown procedure of a pulley drive system, a hoist, a power tool, or another driven load based on the amount of remaining energy, with the term "range" in this instance possibly referring to remaining operating time or life of the battery pack as opposed to travel distance.

In a particular embodiment, the method includes measuring a set of battery parameters using at least one electrical sensor, with the parameters including a battery voltage, a battery current, and a battery temperature of the battery pack. The method includes estimating, in real-time using the battery parameters, a static state of charge difference ($\Delta$SOC) value and a current-dependent $\Delta$SOC value, with such estimation including calculating the static $\Delta$SOC value as a difference between an average SOC of the battery pack and an SOC of a weakest/lowest energy one of the cells/cell groups, wherein the current-dependent $\Delta$SOC value is a percentage SOC per unit of the current. Additionally, the controller filters the static $\Delta$SOC value and the current-dependent $\Delta$SOC value via a multi-parameter state estimator block to derive filtered state values, then uses the filtered state values to estimate the remaining energy in the battery pack. The method includes executing a control action with respect to the battery pack responsive to the estimated remaining energy, including displaying the remaining energy and/or a quantity derived from the remaining energy, e.g., range, via a display device.

A powertrain system is also disclosed having the above-noted battery pack, a driven load connected to an electric machine, electrical sensor(s) configured to measure the set of battery parameters, a display device, and a controller configured to perform the above-summarized method.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
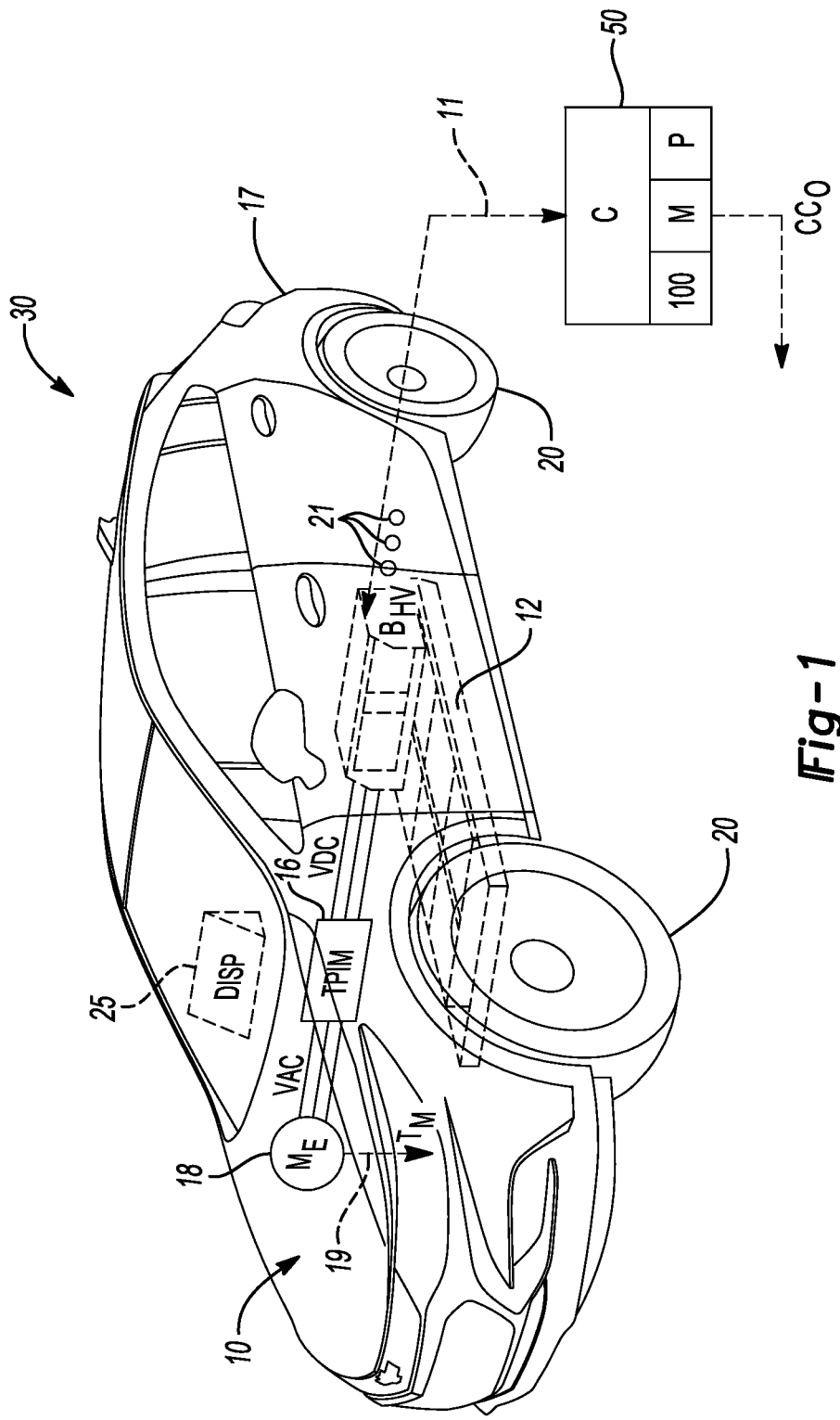
FIG. 1 is a schematic illustration of an example vehicle having an electric powertrain, a propulsion battery pack, and a controller configured to estimate remaining energy and predict a remaining electric range of the vehicle according to the method described herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numerals are used to identify like or identical components in the various views, an example powertrain system 10 is depicted in FIG. 1. The powertrain system 10 includes a rechargeable battery pack ($B_{HV}$) 12 and a controller (C) 50, with the subscript "HV" representing high-voltage. The term "high-voltage" refers herein to voltage levels of 60-300V or more in some embodiments, with voltage levels as low as 18-60V being "high-voltage" relative to 12-15V auxiliary voltage levels depending on the desired use of the powertrain system 10 and the battery pack 12. The controller 50 is programmed with a computer-executable algorithm embodying a method 100, an example of which is described below with reference to FIGS. 6A-6B. In real-time, the controller 50 estimates a remaining amount of usable energy/electrical power of the battery pack 12 and, when the controller 50 is used in an example vehicle 30 of FIG. 1, to estimate a remaining electric range of travel of the vehicle 30.

The exemplary vehicle 30 may be optionally embodied as a motor vehicle having a set of road wheels 20, with at least some of the road wheels 20 being drive wheels, the rotation of which propels the vehicle 30. Alternatively, the powertrain system 10 may be used to power other types of vehicles, such as but not limited to rail vehicles/trains, aircraft, and marine vessels. Likewise, the powertrain system 10 may be used in non-vehicular applications, including powerplants, robots, mobile platforms, hoists, drills, or other such power equipment. For illustrative simplicity and consistency, the vehicle 30 will be presented hereinafter as an example application of the powertrain system 10 without limiting the powertrain system 10 to such an embodiment.

Figure 2:
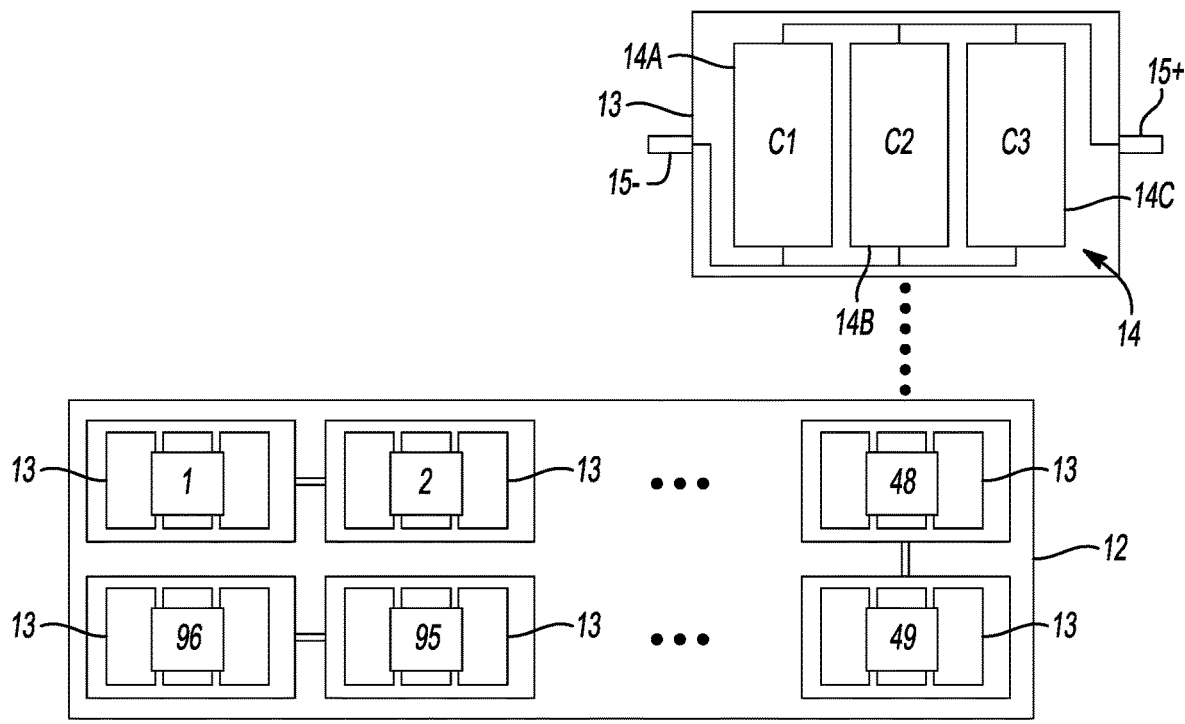
FIG. 2 is schematic illustration of an example multi-cell group configuration of the battery pack shown in FIG. 1.

Referring briefly to FIG. 2, the battery pack 12 is constructed from serial connections of one or more cells 14, which may be a series string of singular cells 14 or a connected series of battery cell groups 13. Each cell group 13 may include individual battery cell 14, shown for example as a triplet of battery cells 14A, 14B, and 14C. As noted above, the battery cell 14 include a thin layer of insulating material (not shown) disposed between positive (+) and negative (−) metal electrode foils. Although omitted for clarity, the electrode foils are enclosed within a sealed outer pouch containing an electrolyte material, with extensions of the electrode foils protruding from the pouch as positive and negative cell tabs 15+ and 15−, respectively. The cell tabs are ultimately welded together via interconnecting members or weld caps (not shown) to construct the battery pack 12.

In the example cell triplet embodiment of FIG. 2, the three battery cells 14A, 14B, and 14C, also labeled C1, C2, and C3 for clarity, may be connected in electrical parallel within the cell group 13. An application-specific number of the cell groups 13 is connected together in electrical series to construct the battery pack and provide a task-suitable voltage capacity. For instance, ninety-six (96) or more of the illustrated cell groups 13 may be used in the illustrated example configuration of the battery pack 12, as represented by cell groups 1, 2, . . . , 48, 49, . . . 95, and 96.

In the representative vehicle 30, remaining range is traditionally estimated based on an average SOC of the battery pack 12. However, a faulty cell triplet often has a lower SOC relative to the pack average due to factors such as self-discharge and reduced capacity. As a defective or weak cell triplet cannot be turned off, disconnected, or otherwise isolated in a typical battery architecture, the faulty cell triplet will tend to reach a calibrated minimum voltage limit earlier than the remaining "good" cell triplets.

Once such a lower limit is reached by a single cell group 13, a battery controller will ordinarily execute necessary control actions for preventing further discharge, which may include a total shutdown of the battery pack 12. An operator may not be made aware of the imminent decrease in or total loss of propulsion capability. This is particularly true when the range has been overestimated. The present method 100 is intended to help account for effects of a weak cell group 13 in ways that improve the overall accuracy of range estimation by the controller 50.

Referring again to FIG. 1, in the depicted powertrain system 10, the battery pack 12 is electrically connected to an electric machine (ME) 18, such as a traction motor or motor-generator unit, via a traction power inverter module (TPIM) 16. The battery pack 12 operates as a direct-current energy storage device, and therefore the battery pack 12 is connected to the TPIM 16 via a DC voltage bus (VDC). An alternating-current voltage bus (VAC) is used to connect the TPIM 16 to the electric machine 18. Motor output torque (arrow $T_M$) is delivered via a rotor 19 of the electric machine 18 to a coupled load. In the example vehicle 30 of FIG. 1, for instance, the coupled load may be the set of drive wheels 20 positioned with respect to a vehicle body 17, with the motor output torque (arrow $T_M$) used alone or in conjunction with an optional internal combustion engine (not shown) to propel the vehicle 30.

Further with respect to the controller 50, this device or networked devices is in communication with the battery pack 12 and programmed to execute computer-readable instructions embodying the present method 100. The controller 50 receives and communications battery control signals 11 in real time, i.e., during operation of the powertrain system 10. The controller 50 includes a processor (P) and memory (M). Battery control signals 11 include, but are not necessarily limited to, a pack voltage or total voltage of the battery pack 12, a pack current, and a pack temperature, which may be respectively measured and reported via sensors 21 positioned with respect to the battery pack 12. The memory (M) includes tangible, non-transitory memory, e.g., read only memory, e.g., optical, magnetic, flash, etc. The controller 50 also includes sufficient amounts of random-access memory, electrically-erasable programmable read only memory, and the like, as well as a high-speed clock and counter, analog-to-digital and digital-to-analog circuitry, and input/output circuitry and devices, as well as appropriate signal conditioning and buffer circuitry.

Execution of the method 100 enables the controller 50 of FIG. 1 to automatically generate and transmit output signals (arrow $CC_O$) to the powertrain system 10 to control operation thereof. The output signals (arrow $CC_O$) may, in some embodiments, also include data signals, which are transmitted to a display device (DISP) 25, such as a display screen located in an instrument panel or center stack (not shown) aboard the vehicle 30. Such output signals (arrow $CC_O$) in data form may communicate a remaining electric range of the vehicle 30, which in turn is derived via execution of the method 100.

Figure 4A:
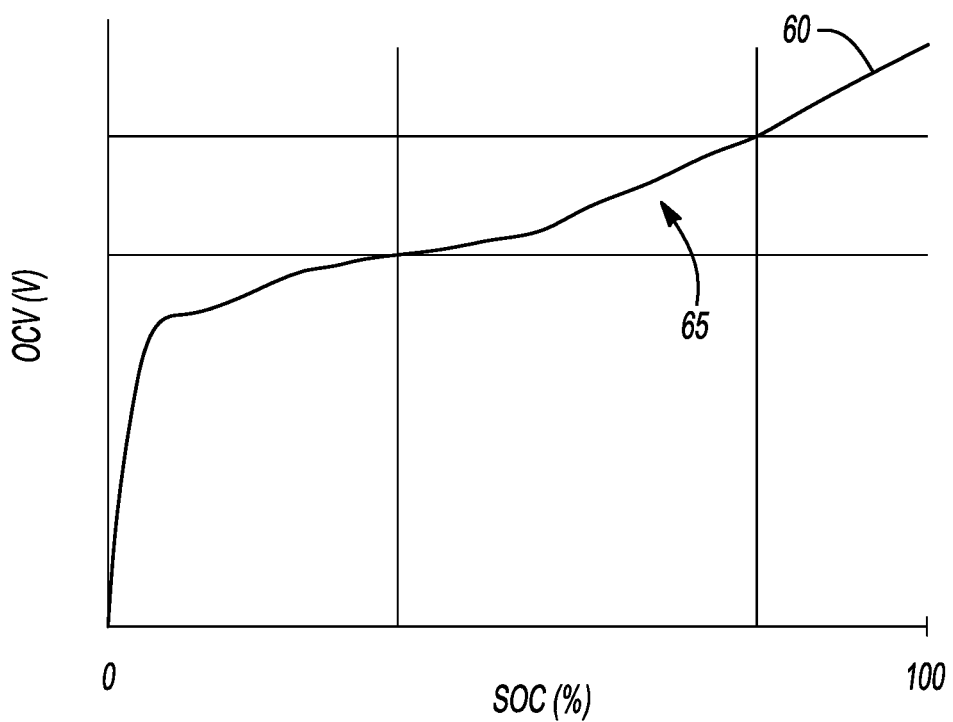
FIG. 4A is a plot of a representative non-linear relationship between an open-circuit voltage (vertical axis) and a state of charge (horizontal axis) for an exemplary cell group.
Figure 4B:
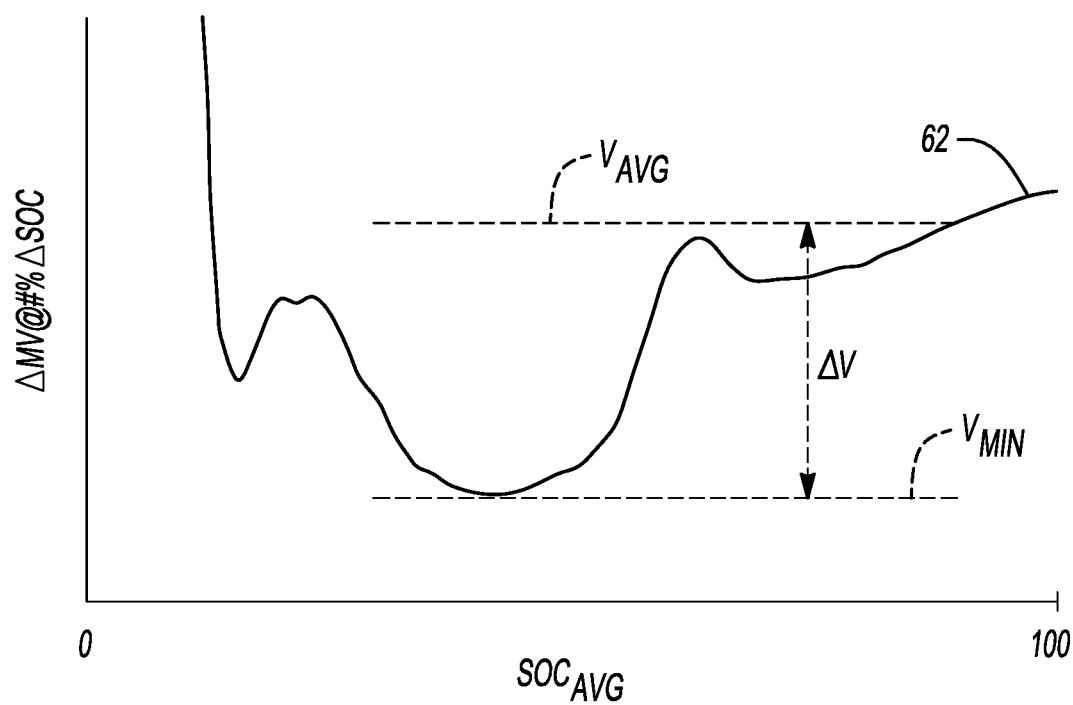
FIG. 4B is a plot of a representative non-linear relationship between an expected voltage difference (vertical axis) and an average state of charge (horizontal axis) of the cell group whose performance is represented in the plot of FIG. 4A.
Figure 5A:
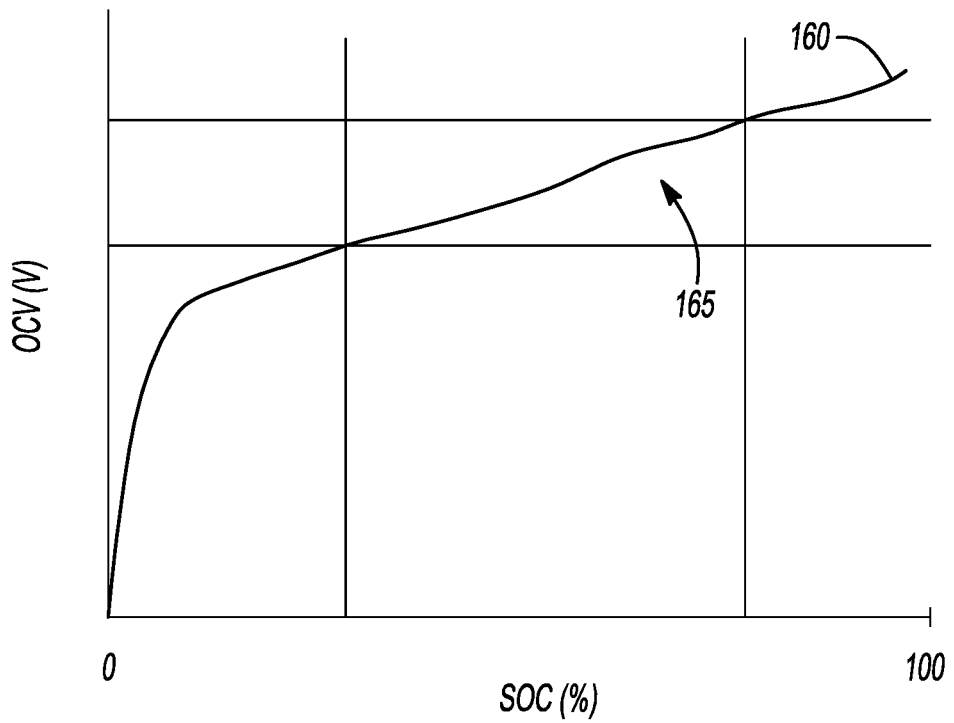
FIG. 5A is a plot of a representative linear relationship between an open-circuit voltage (vertical axis) and state of charge (horizontal axis) of a battery pack.

The present method 100, as described in further detail below, calculates a state of charge difference ($\Delta$SOC) between the various battery cells 14/cell groups 13 of FIG. 2 in lieu of a cell voltage difference. Among other potential benefits, such an approach is intended to increase the signal-to-noise ratio in battery chemistries having a non-linear voltage curve, e.g., as depicted in FIGS. 4A and 4B. However, the method 100 is also useful in battery chemistries exhibiting a linear response, such as the example response depicted in FIGS. 5A and 5B.

Figure 3:
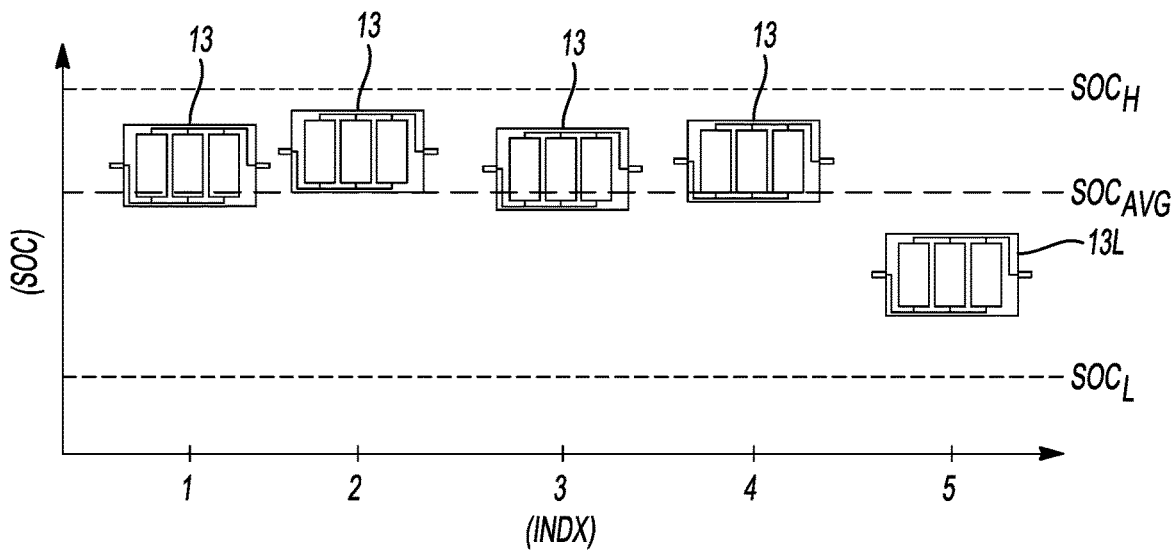
FIG. 3 is a plot of a possible state of charge distribution for an example set of cell groups.

FIG. 3 illustrates five example cell groups 13 of the battery pack 12 at different states of charge, with the state of charge (SOC) depicted on the vertical axis and the cell index (INDX), i.e., nominal cell group 1, 2, 3, 4, or 5, depicted on the horizontal axis. The battery pack 12 has upper and lower SOC limits labeled $SOC_H$ and $SOC_L$, respectively, above or below which the controller 50 may shut down operation of the battery pack 12, with the battery pack 12 also having a pack average ($SOC_{AVG}$). The pack-average SOC may be determined in various ways, for example using the approach disclosed in U.S. Pat. No. 9,575,128 to Frost et al., which is hereby incorporated by reference in its entirety. Other approaches include referencing a temperature-referenced lookup table indexed by an average pack voltage. For example, an average pack voltage may be calculated by dividing a measured, modeled, calculated, or otherwise determined battery pack voltage by the number of battery cell 14 and/or cell groups 13 used in the battery pack 12, i.e., $$V_{AVG} = \frac{V_B}{\#Cells}$$

where $V_{AVG}$ is the average cell voltage, $V_B$ is the present pack voltage, and #Cells is the number of battery cell 14 or cell groups 13.

As part of the method 100, the controller 50 estimates a difference between the pack average SOC ($SOC_{AVG}$) and the SOC of the lowest energy/weakest of the cell group(s) 13, which is the cell group 13L in the simplified illustration of FIG. 3. The raw $\Delta$SOC value is fed into a multi-parameter state estimator of the controller 50, as disclosed below with reference to FIGS. 6A and 6B. This action enables performance of real-time calculations by the controller 50 rather than requiring the battery pack 12 to settle over time to a steady-state condition. Thus, the $\Delta$SOC value is used by the controller 50 to more accurately calculate the remaining energy in the battery pack 12, and in turn, to more accurately calculate and ultimately display the remaining range via the display device 25 of FIG. 1. Likewise, the method 100 allows the controller 50 to perform other beneficial control actions with respect to the powertrain system 10 or the vehicle 14, with various example control actions set forth below with reference to FIGS. 6A and 6B.

Referring to FIG. 4A, a trace 60 describes an exemplary non-linear open-circuit voltage-to-SOC relationship of the type prevalent in certain battery chemistries, e.g., lithium-ion. Open-circuit voltage is abbreviated OCV and depicted on the vertical axis, while SOC is depicted as a percentage (SOC (%)) on the horizontal axis. As will be appreciated, OCV is determined absent a coupled load to the battery pack 12, and therefore OCV cannot be measured during dynamic operation of the powertrain system 10, such as while driving the example vehicle 30 of FIG. 1. The terminal voltage of the battery pack 12 dynamically changes due to electrochemical effects within the battery cell 14 of the battery pack 12, with OCV being the voltage level that is eventually reached when a load normally applied to the battery pack 12 is removed. Thus, OCV may be determined offline and recorded in memory (M) of the controller 50, such as in a temperature-specific lookup table.

A non-linear region 65 is present in trace 60. The battery cell groups 13 of the battery pack 12 may be charged to 100% SOC, which may correspond to about a particular voltage level, e.g., about 4V for a particular lithium-ion battery chemistry. As will be appreciated, once 100% SOC is achieved, a defined battery current may be used to slowly taper the charge rate (C-rate). The battery pack 12 is discharged at a defined current level for a prescribed number of amp-hours. Once the defined amp-hour point has been reached, the battery pack 12 is then rested for a calibrated duration such as 1-3 hours. The above steps are repeated until the battery pack 12 reaches a defined cutoff voltage, e.g., 2.5V for the above-noted example lithium-ion cell construction. Upon reaching the defined cutoff voltage, the discharge current is again tapered until discharge is complete. The total amp-hours for such a process represent the total capacity of the battery pack 12, and thus such a value is used to calculate the SOC percentage at the various voltage points. Other approaches may be used that correspond to voltage setpoints other than those noted above, and therefore the example values are non-limiting and illustrative of the present teachings.

FIG. 4B depicts another trace 62 of expected voltage spread $\Delta V$ shown in millivolts, where $\Delta V = V_{AVG} - V_{MIN}$, i.e., the average battery pack voltage less the minimum cell voltage, respectively. The vertical axis depicts a particular voltage difference in mV (i.e., $\Delta mV$) at a given $\Delta$SOC value (i.e., # $\Delta$SOC), for instance 8% $\Delta$SOC or 9% $\Delta$SOC. Relative to the voltage relationship depicted in FIG. 4B as trace 62, for a highly non-linear battery chemistry the use of the present SOC difference as part of method 100 increases the signal-to-noise ratio. However, the present method 100 is also useful in battery chemistries having an approximately linear response, with an example linear relationship shown in linear region 165 of trace 160 FIG. 5A. Note that trace 162 of corresponding FIG. 5B exhibits about 50-60% of the voltage spread of trace 62 of FIG. 4B.

Currently, battery power capability estimation techniques, particularly when performed in torque-generating systems having a battery pack similar in construction to the example battery pack 12 of FIG. 1, involve calculating a voltage spread as a difference between an average cell voltage and a minimum cell voltage. When the minimum cell voltage is less than a calibrated voltage limit, the calibrated voltage limit may be increased based on the magnitude of the voltage spread. The amount of adjustment or offset is recorded, with power capability thereafter estimated using the recorded offset when the battery pack once again operates under the same operating conditions. Such an approach, by requiring a defined voltage limit to be reached, are considered to be reactive. The present approach in contrast is proactive, specifically by utilizing the static $\Delta SOC$ and dynamic/current-dependent $\Delta SOC$ values noted above to predict, in real-time, precisely what the cell spread will be, with the prediction possibly used in control of the powertrain system 10 and range estimation of the vehicle 30 shown in FIG. 1. Other possible uses of the present method 100 enabled by the method 100, as will be appreciated by one of ordinary skill in the art, include, by way of a few non-limiting examples, the identification of defective cell 14, e.g., low-capacity cell 14, high-resistance cell 14, and/or cell 14 having relatively high amounts of self-discharge, with subsequent control actions such as repair or replacement of the particular defective cell 14 and/or the battery pack taken responsive to such an identification.

Figure 6A:
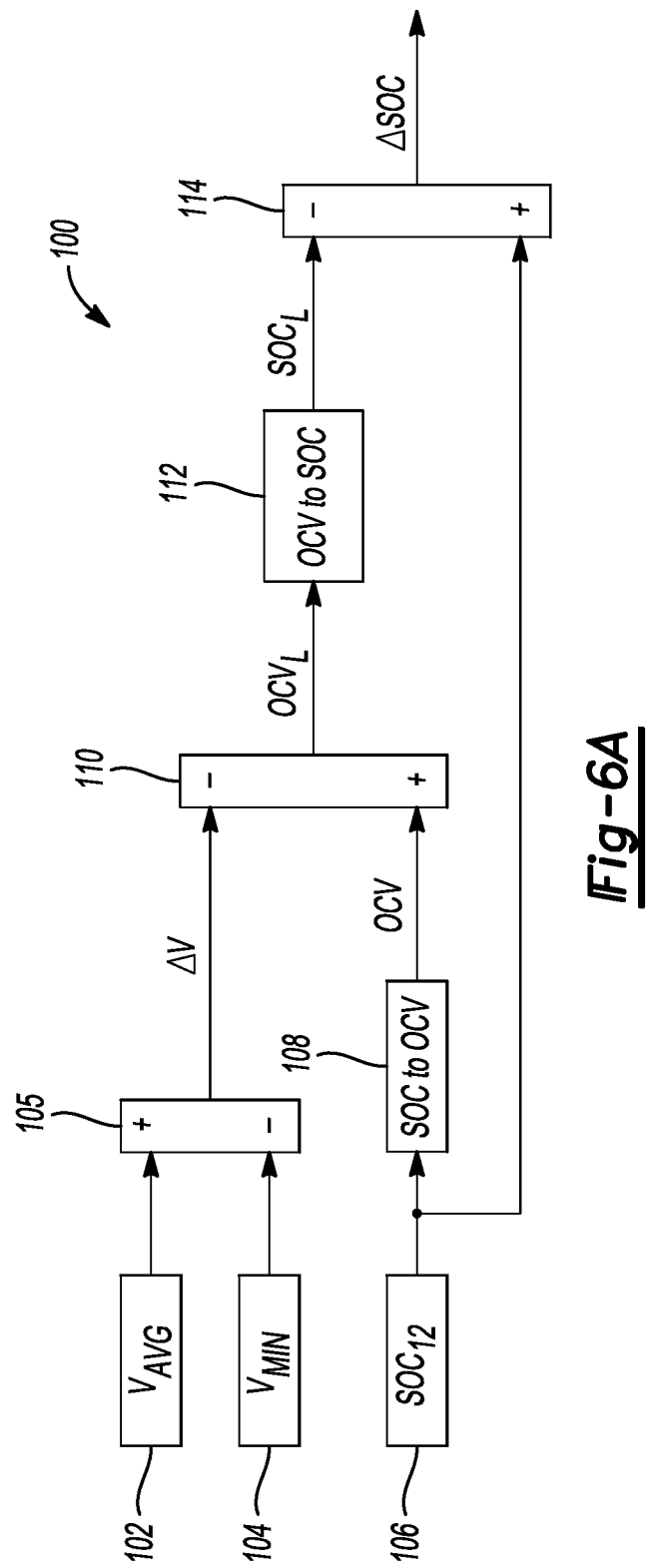
FIGS. 6A and 6B together form a schematic logic flow diagram of an embodiment of the present method.
Figure 6B:

An example embodiment of the method 100 is shown in FIGS. 6A and 6B, with FIGS. 6A and 6B representing control logic of the controller 50 shown in FIG. 1. The method 100 in this particular example application is used aboard the vehicle 30 of FIG. 1. Thus, "range" refers below to the remaining distance of travel of the vehicle 30 in an electric vehicle operating mode for illustrative consistency without limiting the method 100 to vehicular applications. As noted above, the method 100 proceeds by calculating the $\Delta SOC$ value, and ultimately derives the estimated range of the vehicle 30. The estimated range may be displayed as a distance on the display device 25 shown in FIG. 1 for real-time feedback to an operator or passenger of the vehicle 30. A mobile app or a website, or optional text messaging may be used to communicate the estimated range data in different ways.

In FIG. 6A, a logic block 102 of the controller 50 shown in FIG. 1 determines the average cell voltage ($V_{AVG}$) in the battery pack 12. As noted above, cell voltages may be individually measured for each battery cell 14 and averaged, which would entail using a corresponding voltage sensor or sensing electrode within each of the various cell groups 13, or the average cell voltage ($V_{AVG}$) may be calculated by dividing a measured pack voltage of the battery pack 12 as a whole by the number of cell groups 13 used within the battery pack 12. The average voltage is then fed into an operating node 105.

Figure 5B:
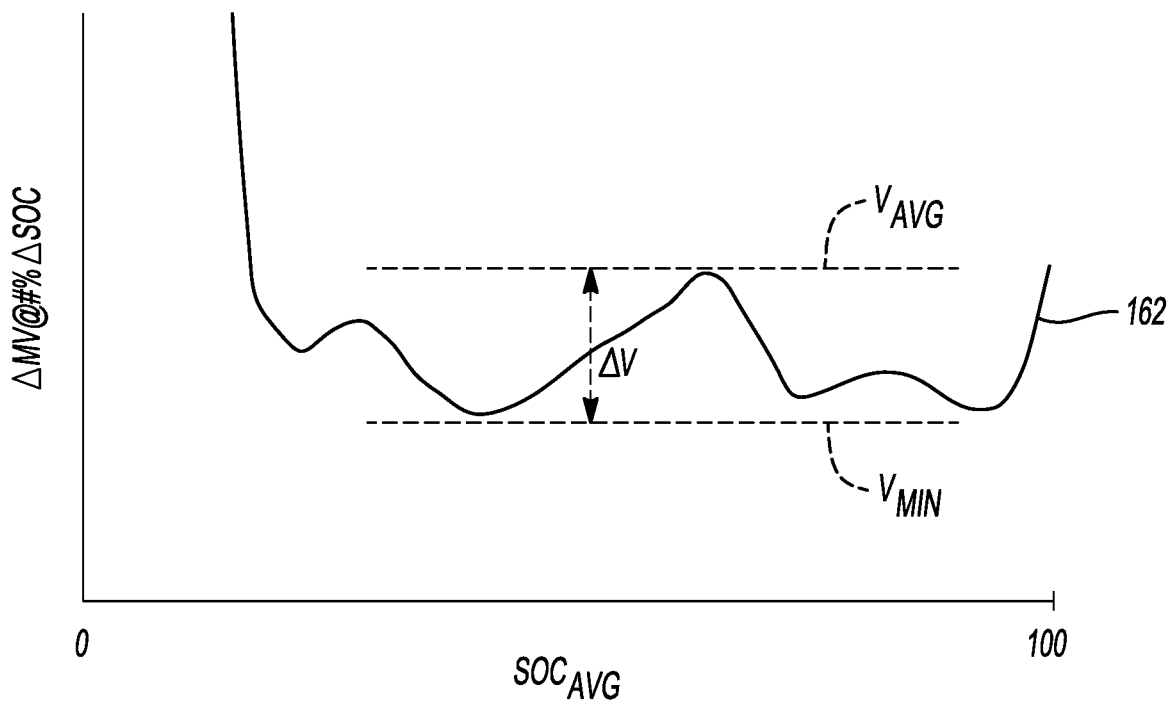
FIG. 5B is a plot of a representative linear relationship between an expected voltage difference and average state of charge of the battery pack whose performance is represented in the plot of FIG. 5A.

Another logic block 104 is used by the controller 50 of FIG. 1 to determine the minimum cell voltage ($V_{MIN}$) within the battery pack 12 when the battery pack 12 is powering a load, e.g., the electric machine 18 shown in FIG. 1. Along with the average voltage determined via logic block 102, the minimum cell voltage is fed into the operating node 105. The voltage values ($V_{AVG}$ and $V_{MIN}$) of respective logic blocks 102 and 104 are also shown in FIGS. 4B and 5B.

At operating node 105, the controller 50 next determines a voltage spread ($\Delta V$) by subtracting the minimum cell voltage ($V_{MIN}$) from logic block 104 from the pack average derived by logic block 102. The cell voltage spread ($\Delta V$) is then fed into another operating node 110.

Still referring to FIG. 6A, another logic block 106 is used to determine the pack-level state of charge of the battery pack 12, with the pack-level SOC abbreviated $SOC_{12}$. Various approaches may be used to determine the pack-level SOC, including the method of the above-referenced U.S. Pat. No. 9,575,128 to Frost et al., modeling and lookup tables, and/or real-time calculation using time-synchronized battery voltage and current signals from the sensors 21 shown in FIG. 1. Once derived, the pack-level SOC is fed into a logic block 108.

Within the logic block 108, the controller 50 accesses an SOC-to-OCV lookup table stored in memory (M), with state of charge (SOC) and open-circuit voltage (OCV) described above. The pack-level OCV is extracted from the lookup table and fed into an operating block 110.

The above-noted operating node 110 of FIG. 6A receives the outputs of node 105 and block 108, i.e., the cell voltage spread ($\Delta V$) and pack-level OCV, respectively. The controller 50 subtracts the cell voltage spread from the pack-level OCV to derive a low-cell OCV, i.e., $OCV_L$, which is then fed into a logic block 112.

Logic block 112, like the logic block 108 described above, uses the lookup table stored in memory (M) of the controller 50. In this instance, the controller 50 extracts the SOC of the lowest cell 14 from the lookup table, represented as $SOC_L$, and feeds the low-cell SOC value into an operating node 114.

Within the operating node 114, the controller 50 derives the above-noted $\Delta SOC$ value by subtracting the low-cell SOC ($SOC_L$) from logic block 112 from the pack-level SOC ($SOC_{12}$) determined in logic block 106. The $\Delta SOC$ value is referred to hereinbelow as the "raw $\Delta SOC$", may be used by the controller 50 to execute control actions with respect to the powertrain system 10 of FIG. 1, with use of the raw $\Delta SOC$ increasing the signal-to-noise ratio for non-linear battery chemistries relative to using the voltage spread ($\Delta V$) from operating node 105. The raw $\Delta SOC$ value is then filtered in certain embodiments, as will now be described with reference to FIG. 6B, in order to provide the various performance advantages noted below.

FIG. 6B continues the method 100 of FIG. 6A from the output of block 114, i.e., the raw $\Delta SOC$ value. An optional filtering implementation feeds the raw $\Delta SOC$ from block 114 of FIG. 6A into a multi-parameter state estimator block 120. For example, two example parameters for a basic two-state estimator implementation include the above-noted static $\Delta SOC$ and a current-dependent $\Delta SOC$ value. The latter value is measured or calculated as percentage SOC per unit of the battery current ($I_B$).

In logic block 118 of FIG. 6B the controller 50 determines the instantaneous battery current ($I_B$), which may be measured via one of the sensors 21 of FIG. 1. The raw $\Delta SOC$ from logic block 114 and the measured battery current ($I_B$) are fed into the multi-parameter state estimator block 120. Temperature (arrow T) may also be measured and fed into block 120 as shown.

Within the multi-parameter state estimator block 120, an innovation value (E) is calculated by the controller 50 as a function of the state parameters, which are the static $\Delta SOC$ and the calculated current-dependent $\Delta SOC$ in this instance, along with the battery current ($I_B$). The term "innovation value" as used herein is a term of art in signal processing akin to combined error and white noise. For an example Kalman filter, for instance:

$$E = \text{raw}\Delta SOC - ((\Delta SOC_{ID})(I_B) + \text{static}\Delta SOC)$$

with $\Delta SOC_{ID}$ being the above-noted current-dependent $\Delta SOC$. Thus, the innovation value/error (E) is the difference between the predicted and raw $\Delta SOC$ values. Block 120, is also intended to minimize the magnitude of such an innovation value (E). State filters other than a Kalman filter may be used, e.g., least-squares or another suitable filtering technique. Minimizing the innovation value (E) in this manner allows the battery current ($I_B$) to vary without requiring responsive changes to the state variables used in the multi-state matrix.

The non-limiting example Kalman filter embodiment of the multi-parameter state estimator block 120 may calculate a gain as a co-variance matrix and an observation matrix, as will be appreciated by those of ordinary skill in the art, with the output used to update prior static ΔSOC and current-dependent ΔSOC values using the innovation value (E) noted above. Updated/filtered static ΔSOC and current-dependent ΔSOC values are output in real-time to a logic block 140.

In logic block 140, the updated/filtered static ΔSOC and current-dependent ΔSOC values are processed by the controller 50 to derive an energy offset and estimated range. Block 140 may include executing one or more control actions ("C.A.") with respect to the battery pack 12 and/or powertrain system 10 responsive to the estimated remaining energy, including displaying the remaining energy and/or electric range or other quantity derived from the remaining energy via the display device 25, and/or performing diagnostics and power capability estimations, with resultant values possibly displayed to an operator using the display device 25 of FIG. 1. Other control actions executed at block 140 may include controlling a dynamic state of the powertrain system 10, such as allocating at least some of the remaining energy from the battery pack 12 to the electric machine 18 based on the remaining energy, and/or selecting and implementing a powertrain operating mode.

For instance, when the vehicle 30 includes an internal combustion engine (not shown) and the electric machine 18 of FIG. 1, the controller 50 may, when the estimated range or remaining energy level is lower than a threshold, allocate more torque from the engine to power the drive wheels 20 and reduce the amount of motor torque (arrow $T_M$). Likewise, the controller 50 may reduce use of such an engine when the remaining energy level is higher than the threshold. Other control actions may include determining a route of travel for the vehicle 30 based on the amount of remaining energy, and/or adjusting the speed/torque of the electric machine 18 responsive to the range estimation.

Additionally, the controller 50 may optionally enable/disable and vary a weight of the static ΔSOC and current-dependent ΔSOC values during transitions in a plug-in charging operation and rest periods of the battery pack 12 shown in FIG. 1. An operator of the example vehicle 30 may be alerted in real-time to specific electrical faults, such as a faulty battery pack 12 or a particular cell 14 thereof, or a faulty cell balancing process, thereby providing specific information that the operator may use to schedule preventive maintenance action. Beyond displaying status information, the controller 50 may dynamically change charging or discharging targets of the battery pack 12, i.e., threshold voltage or SOC levels. Alone or collectively, such control actions are intended to improve operator satisfaction and drive quality.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for estimating remaining energy in a battery pack having a plurality of series-connected cells or cell groups, the method comprising:

measuring a set of battery parameters using at least one electrical sensor, the set of battery parameters including a battery voltage, a battery current, and a battery temperature of the battery pack;

determining, via a controller, a weakest/lowest energy one of the cells or cell groups of the battery pack;

estimating, in real-time using the set of battery parameters, a static state of charge difference (ΔSOC) value and a current-dependent ΔSOC value, the static ΔSOC value including a difference between an average state of charge (SOC) of the battery pack and an SOC of the weakest/lowest energy one of the cells or cell groups, and the current-dependent ΔSOC value including a percentage SOC per unit of the battery current;

filtering the static ΔSOC value and the current-dependent ΔSOC value via a multi-parameter state estimator block of the controller to thereby derive filtered state values;

estimating the remaining energy in the battery pack by calculating a gain as a co-variance matrix and an observation matrix based on the filtered state values to derive an energy offset and estimated range; and executing a control action with respect to the battery pack responsive to the estimated remaining energy, the control action including controlling operation of an electric machine connected to the battery pack based on the remaining energy and displaying the remaining energy and/or a quantity derived from the remaining energy via a display device.

2. The method of claim 1, wherein the control action includes allocating at least some of the remaining energy from the battery pack to the electric machine based on the remaining energy.

3. The method of claim 1, wherein the electric machine is coupled to drive wheels of a motor vehicle, and wherein the control action includes: estimating a remaining electric operating range of the motor vehicle, and displaying the remaining electric operating range via the display device as the quantity derived from the remaining energy.

4. The method of claim 1, wherein the control action includes modifying an output speed or an output torque of the electric machine based on the remaining energy.

5. The method of claim 1, wherein the multi-parameter state estimator includes a Kalman filter minimizing a magnitude of an innovation value error calculated as a function of the static ΔSOC and the current-dependent ΔSOC as:

$$E = \text{raw}\Delta SOC - ((\Delta SOC_{ID})(I_B) + \text{static}\Delta SOC)$$

where E is the innovation value error, rawΔSOC is a raw ΔSOC value, $\Delta SOC_{ID}$ is the current-dependent ΔSOC, staticΔSOC is the static ΔSOC, and $I_B$ is the battery current.

6. The method of claim 1, further comprising:

determining an average cell voltage of the battery pack by dividing the battery voltage by a total number of the cells or cell groups; and extracting the average SOC of the battery pack from a lookup table indexed by the average cell voltage.

7. The method of claim 1, further comprising:
subtracting a cell voltage spread from a pack-level open-circuit voltage (OCV) of the battery pack to derive a low-cell OCV; and
extracting the SOC of the weakest/lowest energy one of the cells or cell groups from an OCV-to-SOC lookup table using the low-cell OCV.

8. The method of claim 1, wherein executing a control action includes identifying a potentially defective cell from within the cells or cell groups of the battery pack as a low-capacity cell, a high-resistance cell, or a high self-discharge cell, and repairing or replacing the identified potentially defective cell and/or the battery pack responsive to identifying the potentially defective cell.

9. The method of claim 1, wherein the control action includes dynamically changing charging or discharging targets of the battery pack responsive to the remaining energy.

10. A powertrain system comprising:
a battery pack having a plurality of series-connected cells or cell groups;
an electric machine connected to the battery pack;
a driven load connected to the electric machine;
at least one electrical sensor configured to measure a set of battery parameters, the set of battery parameters including a battery voltage, a battery current, and a battery temperature of the battery pack;
a display device; and
a controller in communication with the at least one electrical sensor and the display device, the controller being configured to:
determine a weakest/lowest energy one of the cells or cell groups;
estimate, in real-time using the set of battery parameters, a static state of charge difference ($\Delta$SOC) value and a current-dependent $\Delta$SOC value, the static $\Delta$SOC value including a difference between an average state of charge (SOC) of the battery pack and an SOC of the weakest/lowest energy one of the cells or cell groups, and the current-dependent $\Delta$SOC value including a percentage SOC per unit of the battery current;
filter the static $\Delta$SOC value and the current-dependent $\Delta$SOC value using a multi-parameter state estimator block to thereby derive filtered state values;
estimate a remaining energy in the battery pack using the filtered state values; and
execute a control action with respect to the battery pack responsive to the estimated remaining energy, the control action including displaying the remaining energy and/or a quantity derived from the remaining energy via the display device.

11. The powertrain system of claim 10, wherein the control action further includes allocating at least some of the remaining energy from the battery pack to the electric machine based on the remaining energy.

12. The powertrain system of claim 10, wherein the driven load is a set of drive wheels of a motor vehicle, and wherein the control action includes: estimating a remaining electric operating range of the motor vehicle, and displaying the remaining electric operating range via the display device as the quantity derived from the remaining energy.

13. The powertrain system of claim 10, wherein the control action includes modifying an output speed or an output torque of the electric machine based on the remaining energy.

14. The powertrain system of claim 10, wherein the multi-parameter state estimator includes a Kalman filter.

15. The powertrain system of claim 10, wherein the controller is further configured to: determine an average cell voltage of the battery pack by dividing the battery voltage by a total number of the cells or cell groups, and extract the average SOC of the battery pack from a lookup table indexed by the average cell voltage.

16. The powertrain system of claim 10, wherein the controller is further configured to: subtract a cell voltage spread from a pack-level open-circuit voltage (OCV) of the battery pack to derive a low-cell OCV, and extract the SOC of the weakest/lowest energy one of the cells or cell groups from an OCV-to-SOC lookup table using the low-cell OCV.

17. The powertrain system of claim 10, wherein the control action includes identifying a potentially defective cell from within the cells or cell groups of the battery pack as a low-capacity cell, a high-resistance cell, or a high self-discharge cell, and repairing or replacing the identified potentially defective cell and/or the battery pack responsive to identifying the potentially defective cell.

18. The powertrain system of claim 10, wherein the control action includes dynamically changing charging or discharging targets of the battery pack responsive to the remaining energy.

19. The method of claim 1, wherein determining the weakest/lowest energy one of the cells or cell groups includes determining a minimum cell voltage within the battery pack when the battery pack is powering a load.

20. The method of claim 19, further comprising calculating the SOC of the weakest/lowest energy one of the cells or cell groups based on the minimum cell voltage, an average cell voltage of the battery pack, and an open circuit voltage (OCV) of the battery pack.

* * * * *